C. B. BAUMGARTNER.
SCREEN MAKING MACHINE.
APPLICATION FILED APR. 23, 1910.

990,825.

Patented Apr. 25, 1911.
8 SHEETS—SHEET 1.

Witnesses:
B. B. Cox
E. Behel.

Inventor:
Charles B. Baumgartner
by A. O. Behel
Attorney

C. B. BAUMGARTNER.
SCREEN MAKING MACHINE.
APPLICATION FILED APR. 23, 1910.

990,825.

Patented Apr. 25, 1911.
8 SHEETS—SHEET 2.

Witnesses:
B. B. Cox
E. Behel

Inventor:
Charles B. Baumgartner
by A. O. Behel
Attorney

C. B. BAUMGARTNER.
SCREEN MAKING MACHINE.
APPLICATION FILED APR. 23, 1910.

990,825.

Patented Apr. 25, 1911.
8 SHEETS—SHEET 4.

Witnesses:
B. B. Cox.
E. Behel.

Inventor:
Charles B. Baumgartner
by A. O. Behel
Attorney

C. B. BAUMGARTNER.
SCREEN MAKING MACHINE.
APPLICATION FILED APR. 23, 1910.
990,825.
Patented Apr. 25, 1911.
8 SHEETS—SHEET 5.
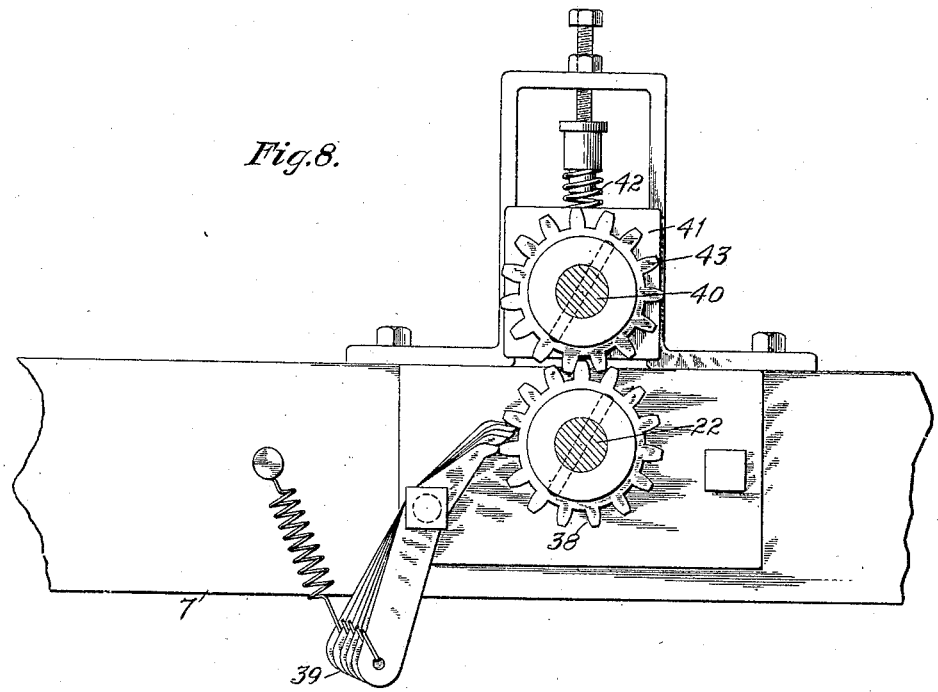
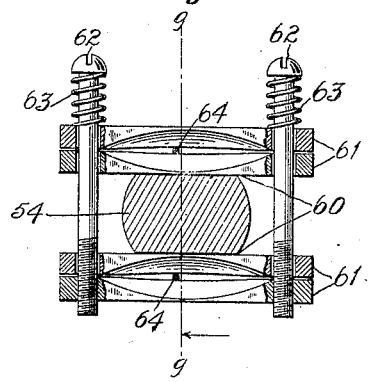
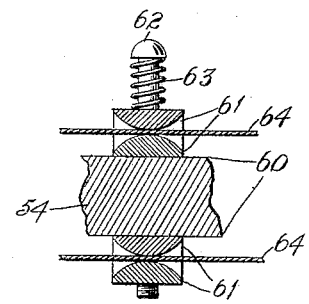
Witnesses:
B. B. Cox
E. Behel
Inventor:
Charles B. Baumgartner
by A. O. Behel
Attorney

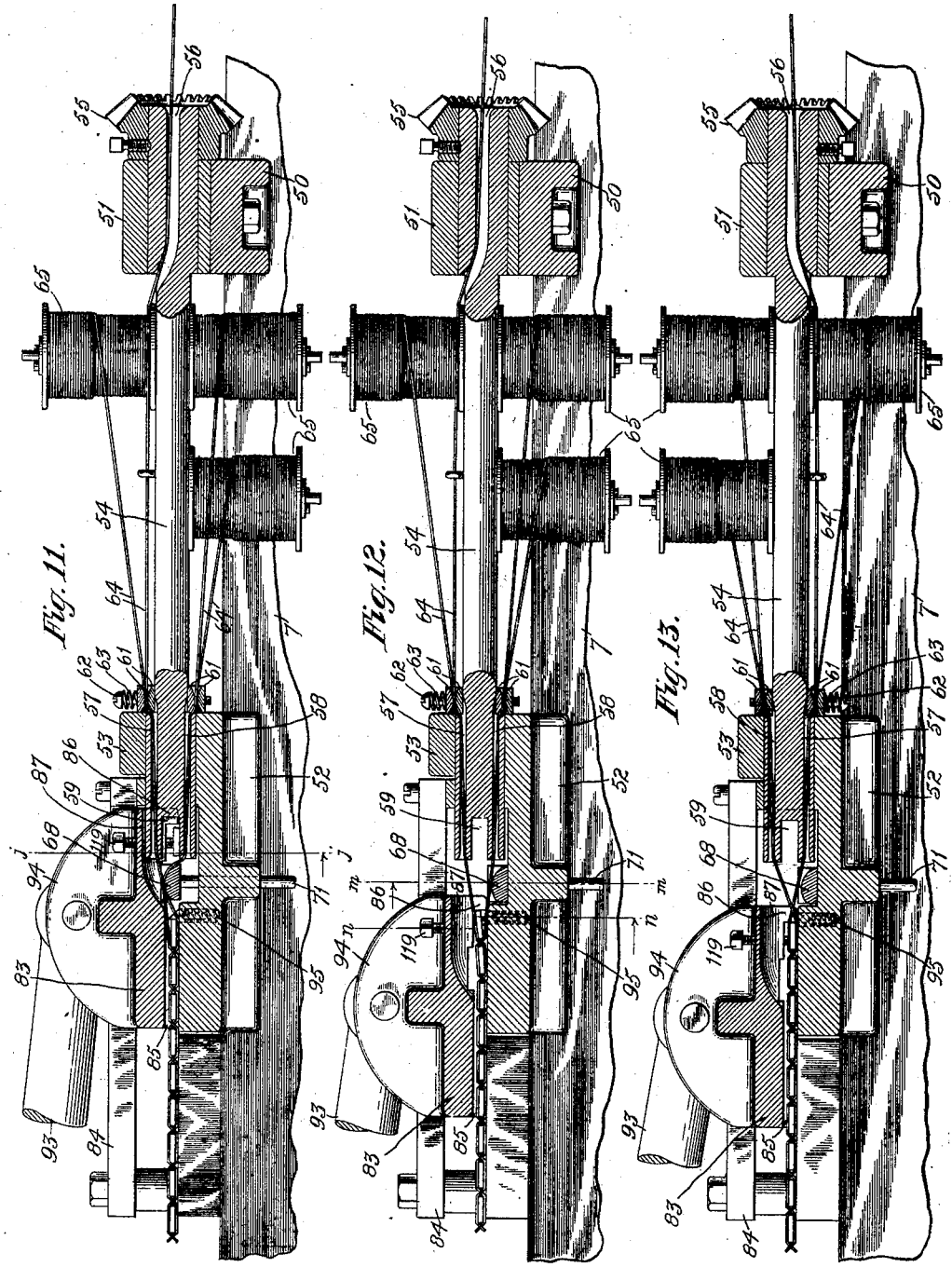

C. B. BAUMGARTNER.
SCREEN MAKING MACHINE.
APPLICATION FILED APR. 23, 1910.
990,825.
Patented Apr. 25, 1911.
8 SHEETS—SHEET 7.
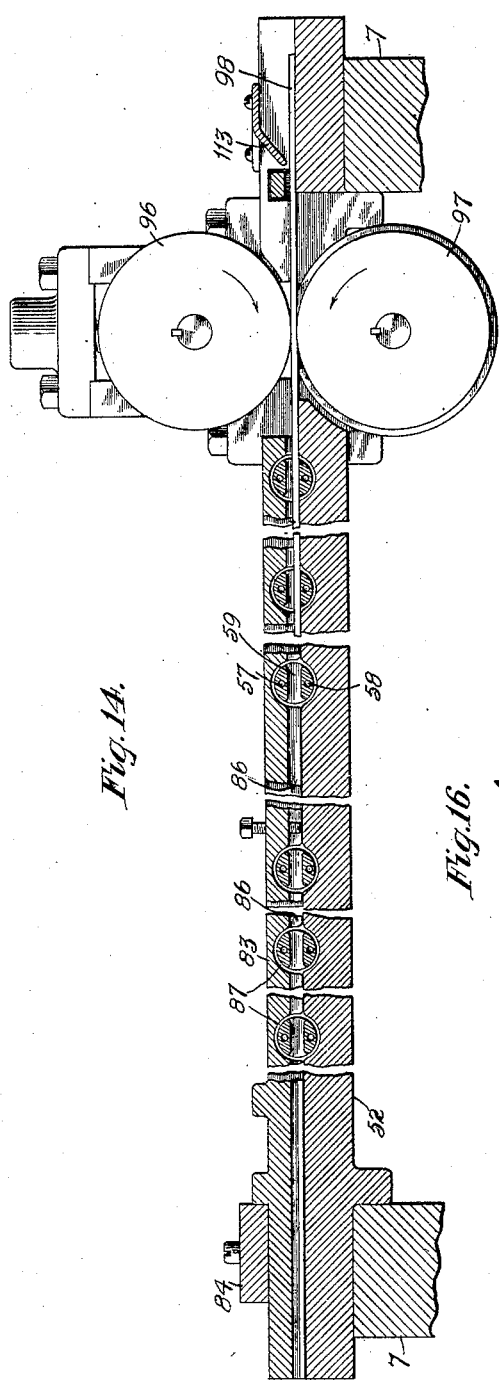
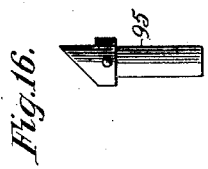
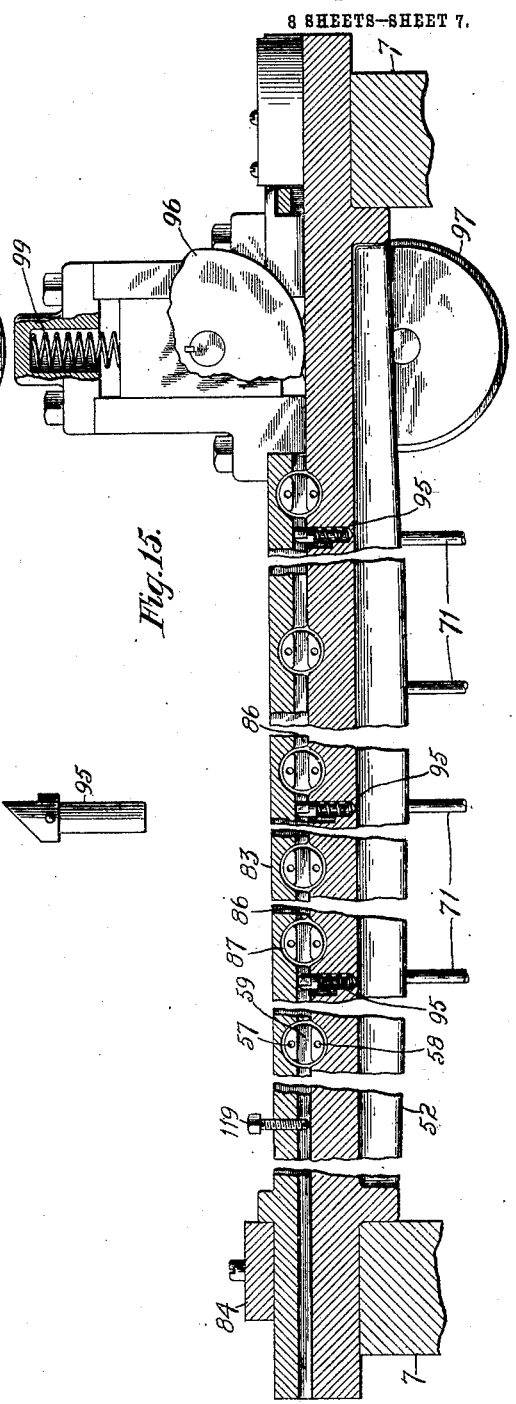
Witnesses:
B. B. Cox
E. Behel.
Inventor:
Charles B. Baumgartner
by A. O. Behel
Attorney

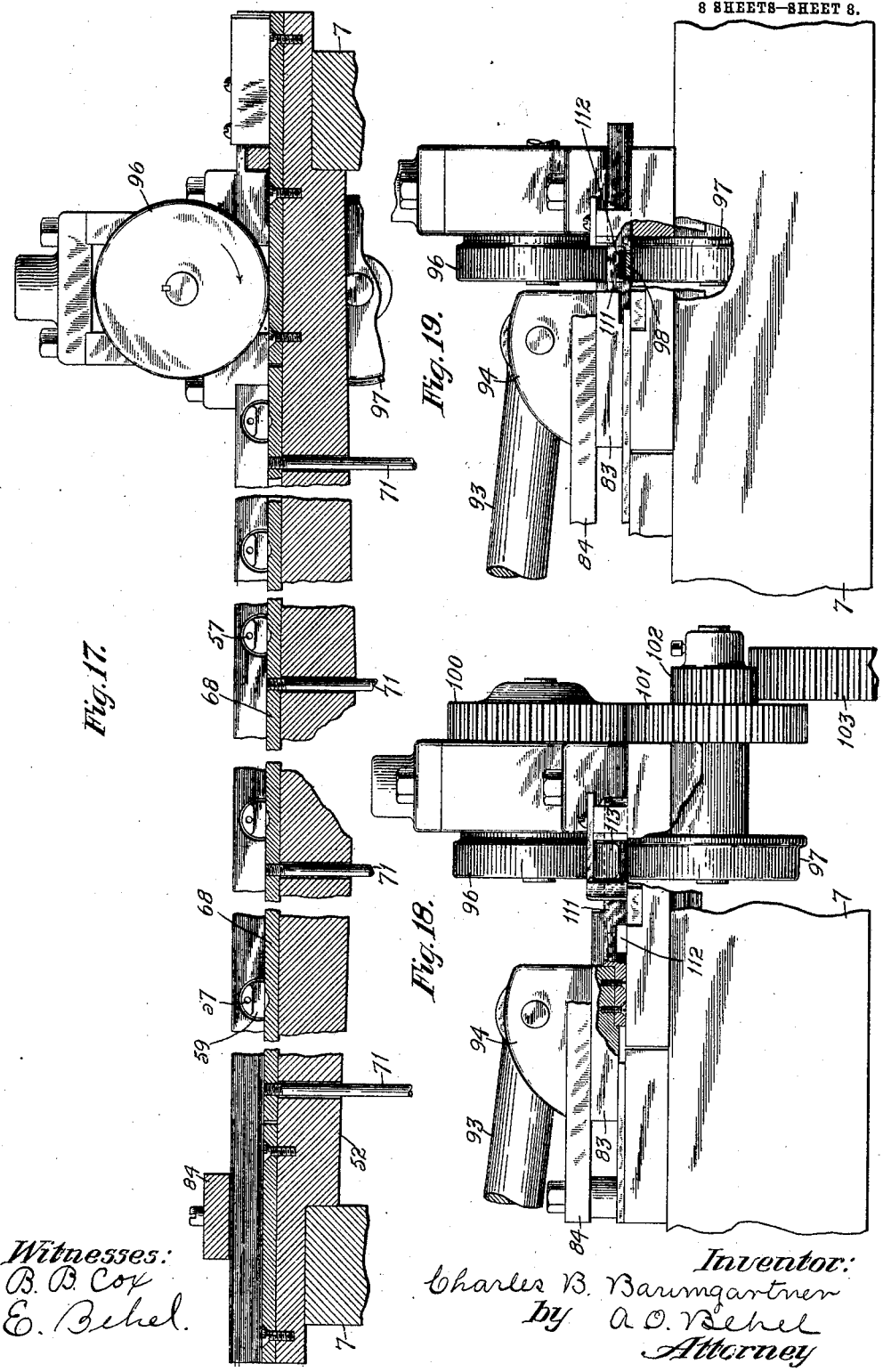

UNITED STATES PATENT OFFICE.

CHARLES B. BAUMGARTNER, OF CEDAR RAPIDS, IOWA.

SCREEN-MAKING MACHINE.

990,825.

Specification of Letters Patent.

Patented Apr. 25, 1911.

Application filed April 23, 1910. Serial No. 557,307.

*To all whom it may concern:*

Be it known that I, CHARLES B. BAUMGARTNER, a citizen of the United States, residing at Cedar Rapids, in the county of Linn and State of Iowa, have invented certain new and useful Improvements in Screen-Making Machines, of which the following is a specification.

The object of this invention is to construct a machine for weaving together wooden strips in a manner to form a porch screen.

Figure 1:
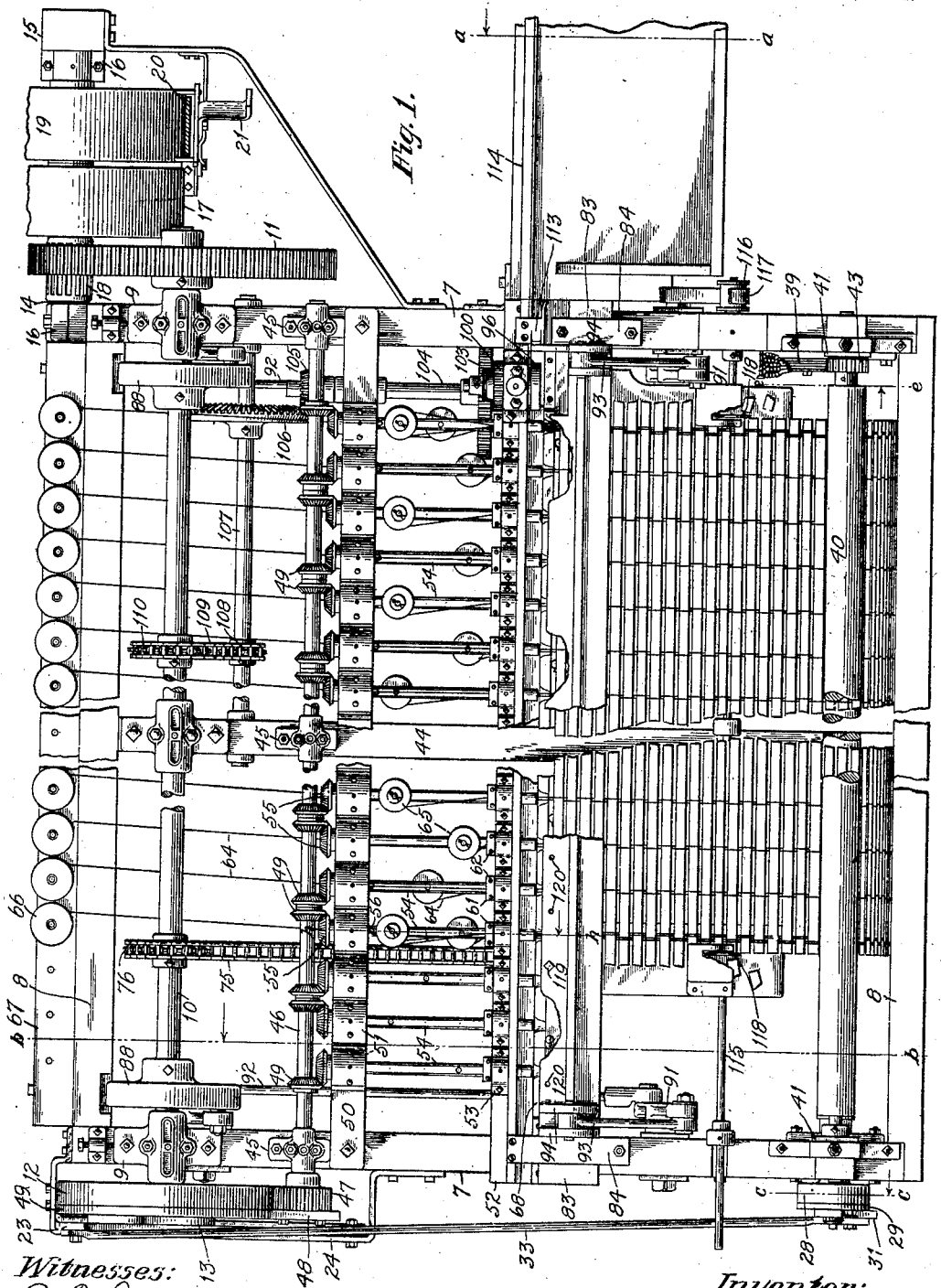
Figure 2:
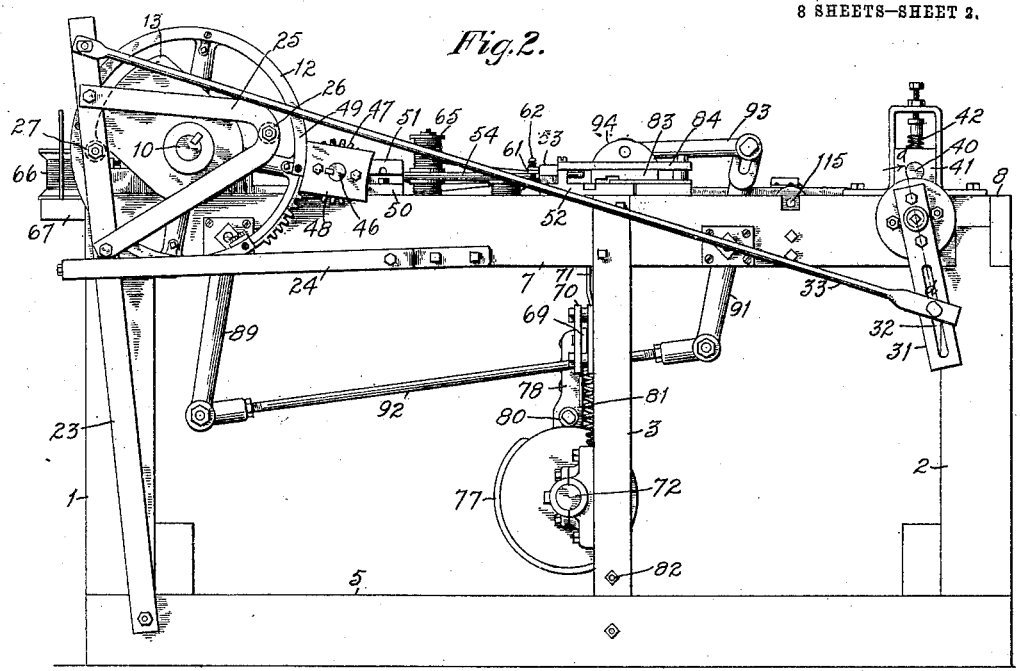
Figure 3:
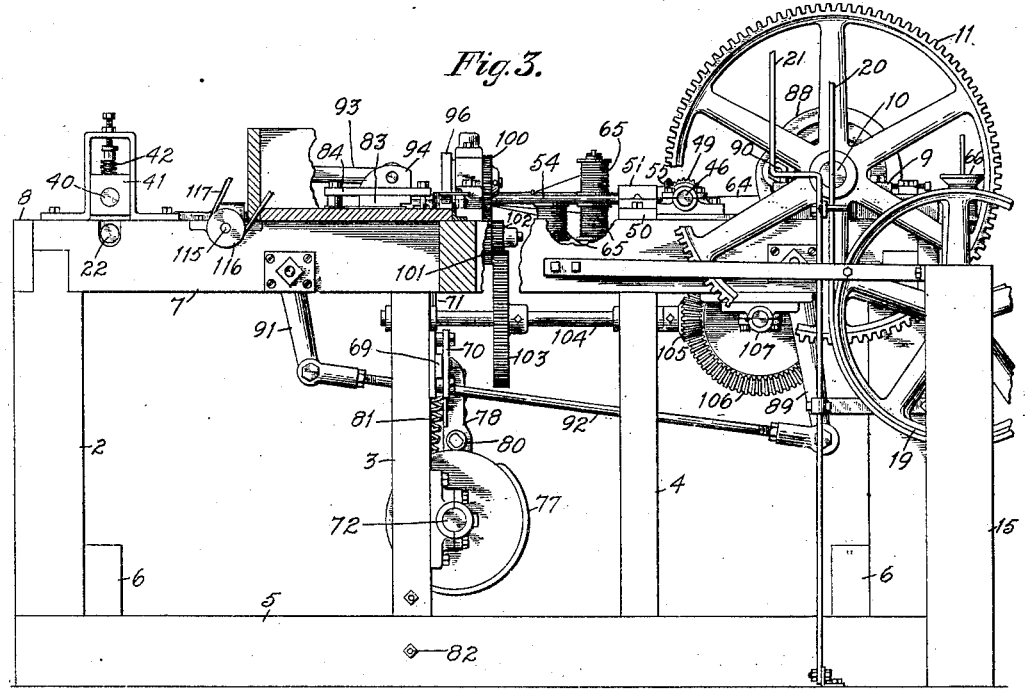
Figure 4:
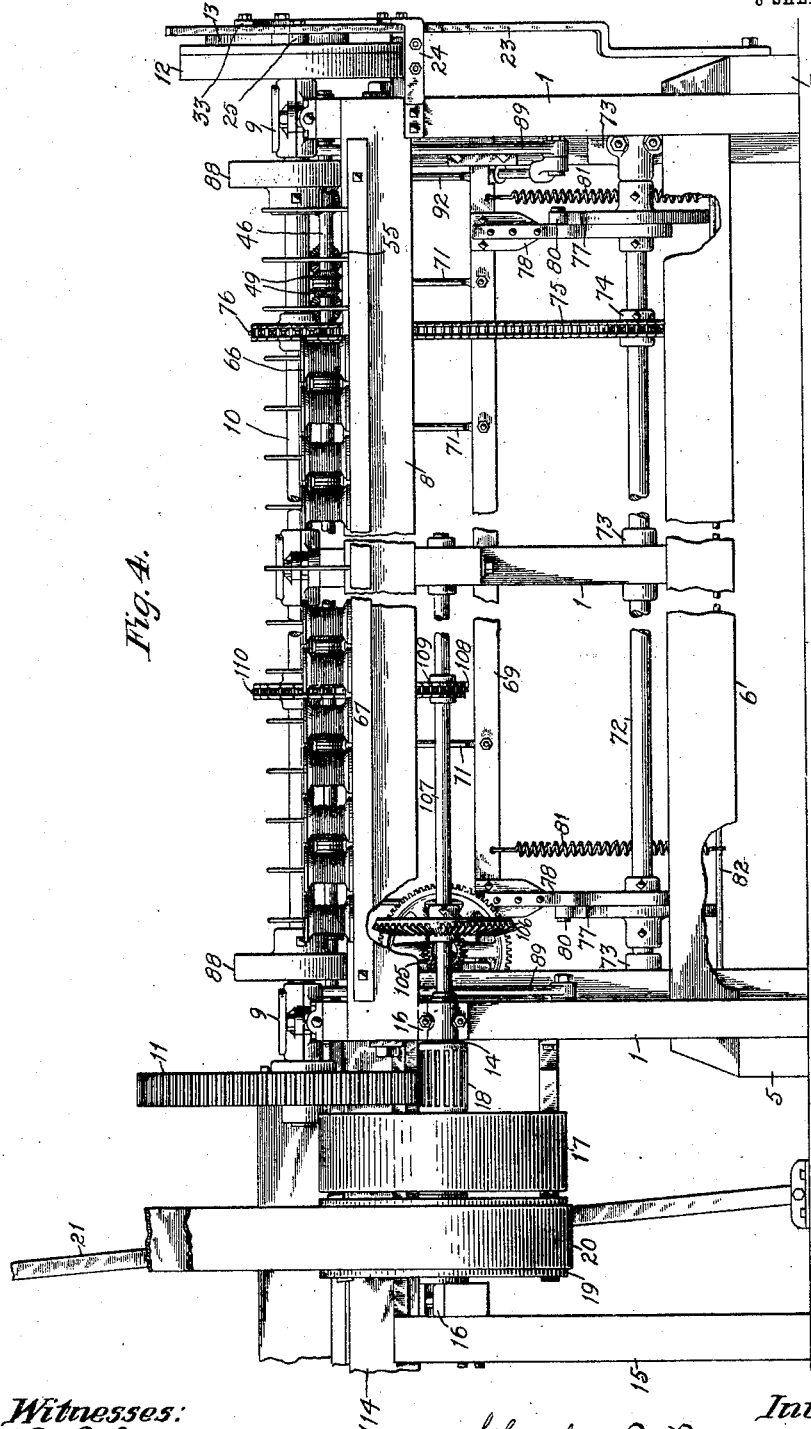
Figure 5:
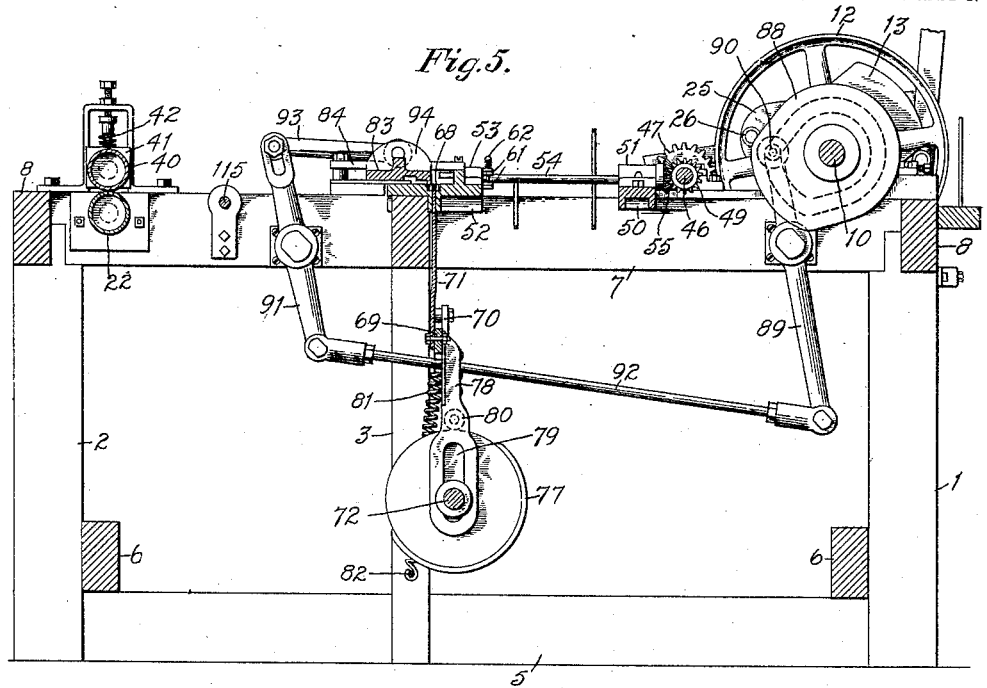
Figure 6:
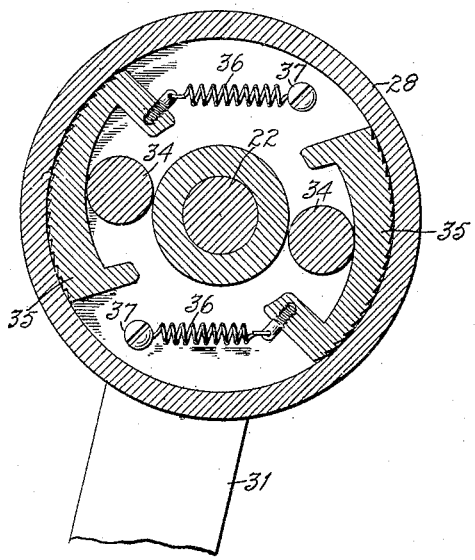
Figure 7:
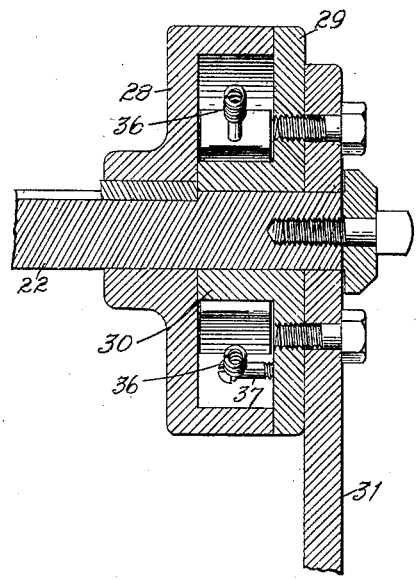

In the accompanying drawings, Figure 1 is a plan view of my improved screen making machine. Fig. 2 is an end elevation. Fig. 3 is a transverse section on dotted line $a\,a$ Fig. 1. Fig. 4 is a side elevation. Fig. 5 is a transverse section on dotted line $b\,b$ Fig. 1. Fig. 6 is a section of the clutch on dotted line $c\,c$ Fig. 1. Fig. 7 is a section on dotted line $d\,d$ Fig. 2. Fig. 8 is a section on dotted line $e\,e$ Fig. 1. Fig. 9 is a section on dotted line $f\,f$ Fig. 1. Fig. 10 is a section on dotted line $g\,g$ Fig. 9. Figs. 11, 12 and 13 are sections on dotted line $h\,h$ Fig. 1 showing different positions of the parts. Fig. 14 is a lengthwise vertical section on dotted line $i\,i$ Fig. 11 with a strip partially in position. Fig. 15, is a lengthwise section on dotted line $k\,k$ Fig. 12 in which the completed screen is omitted. Fig. 16 is an elevation of one of the spring actuated detents. Fig. 17 is a lengthwise section on dotted line $m\,m$ Fig. 12. Figs. 18 and 19 are elevations partly in section of the feed end of the machine.

The main supporting frame comprises the front upright 1, rear uprights 2 and intermediate uprights 3 having their lower ends connected by the end beams 5 and side beams 6, and their upper ends connected by end beams 7 and side beams 8.

To the upper faces of the upper end beams 7 are secured boxes 9 which support a main operative shaft 10, to one end of which is fixedly connected a spur gear wheel 11, and to its other end is fixedly connected a mutilated spur-gear 12, and outside of the mutilated spur-gear and to the shaft 10 is secured a cam 13.

A counter-shaft 14 is supported by one of the front uprights 1 and an upright 15 in the bearings 16, and to which are fixedly connected a tight driving pulley 17, and a spur-pinion 18. A loose pulley 19 is supported by the counter shaft over which a driving belt 20 passes. The spur-pinion 18 meshes with the spur-gear 11. When the belt 20 is on the tight pulley 17 the main driving shaft 10 and the mutilated gear 12 and cam 13 will be rotated with it. The shifter lever 21 will transfer the belt 20 between the tight and loose pulleys to start or stop the operative parts of the machine.

The upper end beams 7 of the main frame support a roller 22 in a manner to be rotated by a connection with the main driving shaft which will now be described.

To the outer face of one of the beams 5 is pivoted one end of a rocking-bar 23, the upper portion of which is guided by the bar 24. To the upper portion of the rocking bar 23 is secured a yoke 25 to the outer end of which is pivoted a roller 26, and the upper portion of the rocking-bar supports a roller 27. These rollers 26 and 27 are in position to be engaged by the cam 13 as it rotates, the action being such that the rocking-bar 23 will be rocked on its pivot back and forth, and owing to the shape of the cam, the rocking-bar will remain at rest while its concentric ends are in engagement with the rollers, thereby producing an intermittent movement of the rocking-bar, it standing still for a period of time at the ends of its movement. This intermittent movement of the rocking-bar will, in connection with other mechanism, impart an intermittent rotary movement to the roller 22. To the roller 22 is secured a shell 28.

A cap 29 is located over the open end of the shell 28 and has a hub 30 receiving the end of the roller 22 and turning loosely thereon. To the cap 29 is secured an arm 31 which is provided with a slot 32 extending in the direction of the length of the arm. A rod 33 has one end pivotally connected to the upper end of the rocking-bar 23, and its other end is pivotally connected to the arm 31 and is adjustable lengthwise thereof by reason of the connecting means being located in the slot 32. The object of this adjustment is to impart greater or less movement to the arm 31 as the throw of the rocking arm remains constant.

To the inner face of the cap 29 are pivoted two rollers 34 and between each roller and inner face of the shell is located a serrated faced dog 35 having its face in contact with the roller eccentric to the roller 22, and to each dog is connected one end of a spiral spring 36, the other end of which is connected to a screw 37 carried by the cap 29. As the arm 31 is rocked back and forth, the cap 29 will be carried with it which will carry the dogs 35, also. The action of the springs 36 is to hold the dogs 35 in contact with the rollers 34 also with the inner face of the shell 28. As the cap is moved in one direction, the rollers 34 will seek to ascend the inclined inner faces of the dogs thereby forcing the dogs hard against the inner face of the shell, with sufficient force to move the shell and the roller 22, connected thereto. The other movement of the cap will cause the rollers to descend the inclined face of the dogs sufficiently to permit the dogs to move backward over the inner surface of the shell in order that the next movement of the cap will cause the dogs to again engage the shell and impart to it another partial rotation. To the roller 22 is secured a spur-gear 38, and a series of spring actuated dogs 39 of varying lengths engage the teeth of the gear and prevent it moving backward.

A roller 40 is supported in bearings 41 and held yieldingly in contact with the roller 22 by the springs 42. To the roller 40 is secured a spur-pinion 43 which meshes with the spur-pinion 38 secured to the rollers 22. The gear connection between the rollers will impart an intermittent rotary movement to the upper roller 40 corresponding to the movement of the lower roller 22, but in the reverse direction. These rollers are intended to draw or carry away the finished screen as it is woven by other mechanism. The springs 42 permit the necessary separation of the top roller for the insertion of the finished screen, also the necessary pressure on the screen to carry it between the rollers.

To the upper face of the upper end beams 7 and the center beam 44 are secured bearings 45 which support a shaft 46 to one end of which is fixedly connected a spur-gear 47 which will be given a one-half revolution when the teeth of the mutilated gear 12 mesh therewith. In order to hold the shaft 46 from moving more than a half revolution at a time, a block 48 is fitted to ride on the periphery of the segmental ring 49 when the teeth are not in mesh, and to turn between the ends of the segmental ring at the time the teeth are in mesh. To the shaft 46 are secured a plurality of miter gears 49 some faced in opposite directions.

To the upper face of the upper end beams 7 and the center beam 44 is secured a bar 50 which supports a plurality of boxes 51. A bed 52 is supported on the upper faces of the upper end beams 7 and the center beam 45, and this bed supports a plurality of boxes 53. The boxes 51 and 53 support the warp used in the manufacture of the screen, and as the supports are all the same, a description of one will answer, reference being had more especially to Figs. 11 to 17 inclusive, I do not deem it necessary to apply reference numerals to each of the supports. Figs. 11, 12 and 13 are sections of the support on dotted line $h$ $h$ Fig. 1, and this support carries warp strands for one edge of the screen.

The support 54 is cylindrical in cross-section and is held in bearings 51 and 53 in a manner to permit of rotation therein. To one end of the support is secured a miter-gear 55, which meshes with one of the miter-gears 49 secured to the shaft 46. The support has a central opening 56 which extends through the periphery thereof back of the bearing 51. The end of the support held by the bearing 53 is formed with two openings 57 and 58 extending in the lengthwise direction of the support, and the extreme end of this portion is formed with a lengthwise slot 59.

A portion of the support 54 adjacent the bearing 53 is flattened on opposite faces as shown at 60 Figs. 9 and 10. Warp tension devices are held in connection with these flat faces and comprises the two sets of bars 61 clamped together by the screws 62, and held yieldingly by the springs 63. Warp strands 64 pass between each pair of plates and are held by the tension of the springs 63. On the support are located three spools 65 containing warp strands, and in this instance there are two on the same face of the support, the warp strands from these two spools passing between the same pair of tension bars and through the same opening in the support adjacent the tension device. The warp strand from the single spool, and the warp strand passing through the opening in the support, pass between the same pair of tension bars and through the same opening in the support adjacent to the support adjacent the tension bars. The warp strand passing through the opening 56 in the support is carried by a spool 66 supported on a bar 67 carried by the main frame.

A bar 68 is located in a groove in the bed 52 adjacent to the ends of the supports 54 as shown at Figs. 11, 12 and 13 and is capable of being raised into the position shown at Fig. 11, thereby closing the end of the slot 59. The means for moving this bar comprises the bar 69 guided in ways 70 connected to the central uprights 3, and rods 71 connect these bars 68 and 69 so that a vertical movement of the bar 69 will move the bar 68.

A shaft 72 is supported in bearings 73 connected to the main frame, and a sprocket wheel 74 is secured to this shaft over which a linked chain 75 passes and also passes over a sprocket wheel 76 connected to the main driving shaft 10. To the shaft 72 are fixedly connected two cam-wheels 77 and to the bar 69 are secured two arms 78 which have their lower ends formed with a slot 79 which receives the shaft 72 and each arm supports a roller 80 which engages the surface of a cam-wheel. Spiral springs 81 have one end connected to the bar 69, and their other ends connected to the rod 82. The action of these springs is to hold the bar 68 down and to permit it to be raised when the rollers 80 contact with the cams on the cam-wheels.

Over the bed 52 is located a horizontally movable carrier for moving a strip out of the slots 59 of the supports in order that the supports may turn a half revolution. This carrier comprises a plate 83 supported to move in guide-ways 84 arranged on the upper face of the upper end beams 7. The underface of this carrier is separated some distance from the upperface of the bed leaving a space 85 for the passage of the completed screen. One edge 86 of this carrier is on a level with the upper face of the bed on which the completed screen rests. This edge is formed with openings 87 so that it may move over the projecting ends of the supports 54 and occupy a position back of the ends of the slots 59 in the supports 54 as shown in Fig. 11. The means for imparting a reciprocating movement to this carrier comprises two faced cams 88 secured to the main driving shaft 10 and rotate therewith. To the inner face of the upper end beams 7 are pivoted rocking arms 89, the upper end of which supports a roller 90 which is located in the grooves of the faced cams 88. A rocking arm 91 is pivoted to the inner face of each of each of the upper end beams 7 and have their lower ends connected to the lower ends of the rocking-arms 89 by the links 92. A link 93 connects the upper ends of the rocking-arm 91 with the ears 94 extending from the upper face of the carrier 83. The movement imparted to the carrier will be to move it toward the supports 54, and there remain at rest, then withdraw it and remain at rest, and repeat as a strip is placed in position and the warp strands wrapped about it. The bed 52 supports a plurality of spring actuated dogs 95 having their upper ends beveled as shown at Fig. 16.

The means for feeding in the strips comprises the two rollers 96 and 97 between which the strip 98 is placed and as they rotate in opposite directions, they will carry it in. The top roller 96 is held down in a yielding manner by the spiral spring 99 acting on the box supporting the roller.

To the shafts of the rollers 96 and 97 are connected spur-gear wheels 100 and 101 respectively which mesh with one another, and to the shaft of the roller 97 is secured a spur-pinion 102 which meshes with a spur-gear wheel 103 supported by a shaft 104 supported in bearings connected to the main frame. To this shaft 104 is connected a bevel-pinion 105 which mesh with a bevel-gear 106 connected to a shaft 107 which is supported in bearings connected to the main frame. To the shaft 107 is secured a sprocket-wheel 108, and a linked chain 109 connects this sprocket-wheel with a sprocket wheel 110 secured to the main driving shaft 10. This connection between the main driving-shaft and the feed rollers will constantly rotate the rollers.

To the underface of the carrier is secured an arm 111 having a rectangular opening 112 a little larger than the cross-section of a strip, so that the strip can pass through it. This arm is movable with the carrier, and when the carrier is in the position shown at Fig. 11, the opening 112 will be in position to admit a strip to pass as shown at Fig. 19. Over the path of movement of the strip and in front of the feed rollers is located a spring finger 113 which is adapted to rest yieldingly on the strip that is being fed in. The table 114 is a support for the strips which are in position to be fed in. The upper end beams 7 support a shaft 115 to which is connected a pulley 116 which is rotated by the belt 117. To this shaft 115 are connected two circular saws 118 in a manner to permit of their adjustment in the lengthwise direction of the shaft. The carrier supports a screw 119 which may be located in any one of the holes 120 between the various supports.

Warp strands are passed through each of the supports that are required for the width of screen to be made. When the parts are in position to receive a strip, the slots 59 of the supports will all stand in a horizontal position as shown at Fig. 14. The carrier is moved into the position shown at Fig. 11, and the bar 68 is raised as shown in said figure. The bar 68 being located over the open ends of the slots 59 form a channel for the passage of the strip. These parts remain in these positions until a strip is moved by the feed rollers in against the screw 119 which acts as a stop to its further movement. The bar 68 is then dropped, and the carrier withdrawn into the position shown at Fig. 13, when the last strip inserted is moved by the carrier until the spring actuated dogs 95 engage it. In Fig. 12, the supports are ready to turn a half-revolution which will bring them into the position shown at Fig. 13. The carrier again moves forward into the position shown at Fig. 11 which will allow the bar 68 to rise ready for the insertion of another strip. Before the finished screen passes between the rollers 22 and 40, the circular saws will cut the strips to the proper length for the proper width screen.

While I have shown double warp strands for the ends of the strips, the center warp strands may be single as shown.

I claim as my invention.

1. The combination of a main frame, a plurality of revoluble supports each formed with a slot across its free end, a movable bar adapted to extend across the open end of the slots, means for moving the bar, means for feeding a strip through the slots, means for withdrawing the strip side-wise from the slots, and means for revolving the supports.

2. The combination of a main frame, a plurality of revoluble supports, each formed with a slot across its free end, the supports provided with two openings one each side of the slot, tension devices carried by the supports, spools carried by the supports, a movable bar adapted to extend across the open end of the slots, means for moving the bar, means for feeding a strip through the slots, means for withdrawing the strip side-wise from the slots, and means for revolving the supports.

3. The combination of a main frame, a plurality of revoluble supports each formed with a slot across its free end, a movable bar adapted to extend across the open end of the slots, means for moving the bar, means for feeding a strip through the slots, means for withdrawing the strip side-wise from the slots, means for retaining the strip in its withdrawn position, and means for revolving the supports.

4. The combination of a main frame, a plurality of revoluble supports, each provided with two openings, means for rotating the supports, friction devices carried by the supports, spools carried by the supports, and means for feeding a strip to be operated upon by the supports.

5. The combination of a main frame, a plurality of revoluble warp carrying supports, and strip feeding mechanism comprising two rollers revoluble in opposite directions, means for holding one roller yieldingly toward the other roller, a reciprocating bar provided with an opening, and means for moving the bar to bring the opening thereof in alinement with the rollers.

6. The combination of a main frame, a plurality of revoluble supports, each formed with a slot across its free end, a movable bar adapted to extend across the open end of the slots, means for moving the bar, means for feeding a strip through the slots, means for withdrawing the strip side-wise from the slots, and an adjustable stop carried by the withdrawing means.

7. The combination of a main frame, a plurality of revoluble warp carrying supports, friction devices carried by the supports, each device comprising two pairs of plates, a pair located each side of a support, and two spring devices acting on the four plates to hold each pair yieldingly together.

8. The combination of a main frame, a plurality of revoluble warp carrying supports, means for feeding a strip to be operated upon by the supports, intermittent rotary rolls for withdrawing the finished screen comprising a shell connected to one of the rolls, a cap for the open end of the shell, two rollers supported by the cap, two serrated faced dogs located between the rolls and the inner face of the shell, springs acting upon the dogs, and means for oscillating the cap.

9. The combination of a main frame, a plurality of revoluble warp carrying supports, means for feeding a strip to be operated upon by the supports, intermediate rotary rolls for withdrawing the finished screen comprising a shell connected to one of the rolls, a cap for the open end of the shell, two rollers supported by the cap, two serrated faced dogs located between the rollers and the inner face of the shell and having cam shaped faces adjacent to the rollers, springs acting upon the dogs, and means for oscillating the cap.

In testimony whereof I have hereunto set my hand in presence of two subscribing witnesses.

CHARLES B. BAUMGARTNER.

Witnesses:
J. L. MATTSON,
CHAS. N. LA PORTE.

---

Copies of this patent may be obtained for five cents each, by addressing the "Commissioner of Patents, Washington, D. C."